(12) United States Patent  
Pan

(10) Patent No.: US 8,565,696 B2
(45) Date of Patent: Oct. 22, 2013

(54) CALIBRATION OF A COMMUNICATIONS TRANSMITTER TO OPTIMIZE DC OFFSET REJECTION AND IMAGE REJECTION

(75) Inventor: Meng-An Pan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 826 days.

(21) Appl. No.: 12/588,616

(22) Filed: Oct. 21, 2009

(65) Prior Publication Data

US 2011/0092168 A1  Apr. 21, 2011

(51) Int. Cl.
*H04B 1/04* (2006.01)
(52) U.S. Cl.
USPC ........................................................ 455/114.3
(58) Field of Classification Search
USPC .......... 455/67.11, 114.2, 114.3, 115.1, 115.2, 455/115.3, 126
See application file for complete search history.

(56) References Cited

U.S. PATENT DOCUMENTS 7,184,714 B1 * 2/2007 Kutagulla et al. ................ 455/73
7,856,048 B1 * 12/2010 Smaini et al. .................. 375/221
7,974,593 B2 * 7/2011 Cole et al. ................... 455/114.3

* cited by examiner

*Primary Examiner* — Blane J Jackson
(74) *Attorney, Agent, or Firm* — Sterne, Kessler, Goldstein & Fox P.L.L.C.

(57) ABSTRACT

A method and apparatus is disclosed to optimize one or more operational parameters of a communications transmitter to reduce undesirable noise and/or interference embedded within a transmitted communications signal resulting from one or more imperfections. A baseband processor selects one or more calibration signals to allow for optimization of one or more statistical parameters. A calibration module determines the one or more statistical parameters of the transmitted communications signal in response to the one or more calibration signals. The calibration module provides one or more compensation parameters indicative of the one or more statistical parameters to the baseband processor module. The baseband processor adjusts the one or more operational parameters of the communications transmitter in response to the one or more compensation parameters. The calibration module and the baseband processor continue to determine the one or more statistical parameters and to adjust the one or more operational parameters in a similar manner until the one or more statistical parameters are optimized.

28 Claims, 12 Drawing Sheets

CALIBRATION OF A COMMUNICATIONS TRANSMITTER TO OPTIMIZE DC OFFSET REJECTION AND IMAGE REJECTION

FIELD OF THE INVENTION

The present invention relates generally to a communications transmitter and specifically to compensation of undesirable noise and/or interference embedded within a transmitted communications signal resulting from one or more imperfections within the communications transmitter.

BACKGROUND

A communication system typically involves transmitting an information signal via a transmitted communications signal from a communications transmitter to a communications receiver over a communication channel. The communications receiver receives the transmitted communications signal as it passes through the communications channel to provide a received communications signal. The communications receiver then recovers the information signal from the received communications signal. However, one or more imperfections within the communications transmitter may cause undesirable noise and/or interference to be embedded within the transmitted communications signal. This undesirable noise and/or interference degrades an ability of the communications receiver to recover the information signal.

Conventional communications systems typically use a loop back configuration in a transceiver configuration, the transceiver configuration including a communications transmitter and a communications receiver. In this configuration, the communications transmitter is directly connected to the communications receiver, thereby the communications receiver directly receives the transmitted communications signal. Alternatively, the transceiver includes a specialized communications receiver that is solely used to determine the undesirable noise and/or interference embedded within the transmitted communications signal. In either scenario, the communications receiver frequency translates or downconverts the transmitted communications signal to approximately zero Hertz or DC to allow a digital signal processor (DSP) to measure the undesirable noise and/or interference. The DSP typically performs a Fast Fourier Transform (FFT) on the transmitted communications signal to measure the undesirable noise and/or interference. This approach, however, consumes both unnecessary power and area, which are both at a premium in today's ever shrinking integrated circuits.

Thus, there is a need for a communications transmitter that compensates for undesirable noise and/or interference resulting from one or more imperfections within the communications transmitter itself that overcomes the shortcomings described above. Further aspects and advantages of the present invention will become apparent from the detailed description that follows.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

Figure 1:
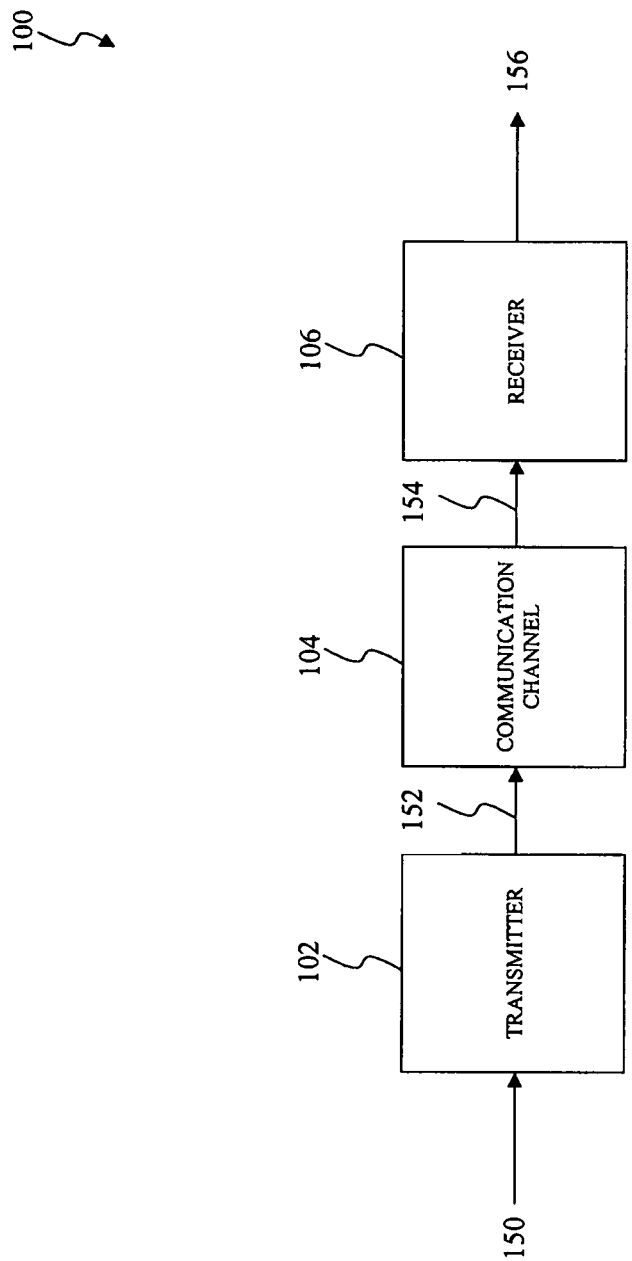
FIG. 1 illustrates a block diagram of a communications environment according to an exemplary embodiment of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the present invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Communications Environment

FIG. 1 illustrates a block diagram of a communications environment according to an exemplary embodiment of the present invention. The communications environment 100 includes a communications transmitter 102 to transmit one or more information signals 150 as received from one or more transmitter user devices to a communications receiver 106 via a communications channel 104. The one or more transmitter user devices may include, but are not limited to, personal computers, data terminal equipment, telephony devices, mobile communications devices, broadband media players, personal digital assistants, software applications, or any other device that is capable of transmitting data.

The communications transmitter 102 provides a transmitted communications signal 152 based upon the one or more information signals 150. More specifically, the communications transmitter 102 modulates the one or more information signals 150 with a first transmitter carrier wave using an in-phase transmitter processing branch to provide an in-phase signal and a second transmitter carrier wave using an quadrature phase transmitter processing branch to provide a quadrature phase signal. The first transmitter carrier wave and the second transmitter carrier wave are substantially similar in frequency but are offset in phase by approximately 90-degrees from one another. The communications transmitter 102 combines the in-phase signal and the quadrature phase signal to provide the transmitted communications signal 152. However, one or more imperfections within the communications transmitter 102 cause undesirable noise and/or interference to be embedded within the transmitted communications signal 152. For example, the one or more imperfections within the in-phase transmitter processing branch and/or the quadrature phase transmitter processing branch cause undesirable noise and/or interference that is frequency translated onto the transmitted communications signal 152 by the first transmitter carrier wave and/or the second transmitter carrier wave. The one or more imperfections may arise from differences between amplitude and/or phase responses of the in-phase transmitter processing branch and quadrature phase transmitter processing branch and/or one or more unwanted offsets that accumulate between these two processing branches.

The transmitted communications signal 152 passes through the communications channel 104 to provide a received communications signal 154. The communications channel 104 may include, but is not limited to, a microwave radio link, a satellite channel, a fiber optic cable, a hybrid fiber optic cable system, or a copper cable to provide some examples. The communications channel 104 contains a propagation medium that the transmitted communications signal 152 passes through before reception by the communications receiver 106.

The communications receiver 106 receives the received communications signal 154 as it passes through the communications channel 104. The communications receiver 106 then determines a most-likely transmitted sequence of modulation symbols of the transmitted communications signal 152 to provide one or more recovered information signals 156 for one or more receiver user devices. The one or more receiver user devices may include, but are not limited to, personal computers, data terminal equipment, telephony devices, mobile communications devices, broadband media players, personal digital assistants, software applications, or any other device that is capable receiving data. However, the undesirable noise and/or interference within the transmitted communications signal 152 may degrade an ability of the communications receiver 106 to recover the one or more recovered information signals 156 from the received communications signal 154.

Communications Transmitter

The communications transmitter 102 compensates for the one or more imperfections within in-phase transmitter processing branch and/or the quadrature phase transmitter processing branch to substantially reduce the undesirable noise and/or interference within the transmitted communications signal 152 through a calibration process, thereby increasing the ability of the communications receiver 106 to recover the one or more recovered information signals 156 from the received communications signal 154. The calibration process reduces the undesirable noise and/or interference embedded within the transmitted communications signal 152 by optimizing one or more operational parameters of the communications transmitter 102, such as one or more unwanted direct current (DC) offsets within the in-phase transmitter processing branch and/or the quadrature phase transmitter processing branch and/or the amplitude and/or the phase responses of the in-phase transmitter processing branch and/or the quadrature phase transmitter processing branch and/or a phase of one or more transmitter carrier waves within the in-phase transmitter processing branch and/or the quadrature phase transmitter processing branch to provide some examples. In an exemplary embodiment, the calibration process optimizes the one or more operational parameters in a serial manner. In this exemplary embodiment, the calibration process determines a first set of the one or more operational parameters that optimize a first statistical parameter. Next, the calibration process uses the first set of the one or more operational parameters to determine a second set of the one or more operational parameters that optimizes a second statistical parameter. The communications transmitter 102 then uses the second set of the one or more operational parameters to effect transmission of the transmitted communications signal 152.

Figure 2:
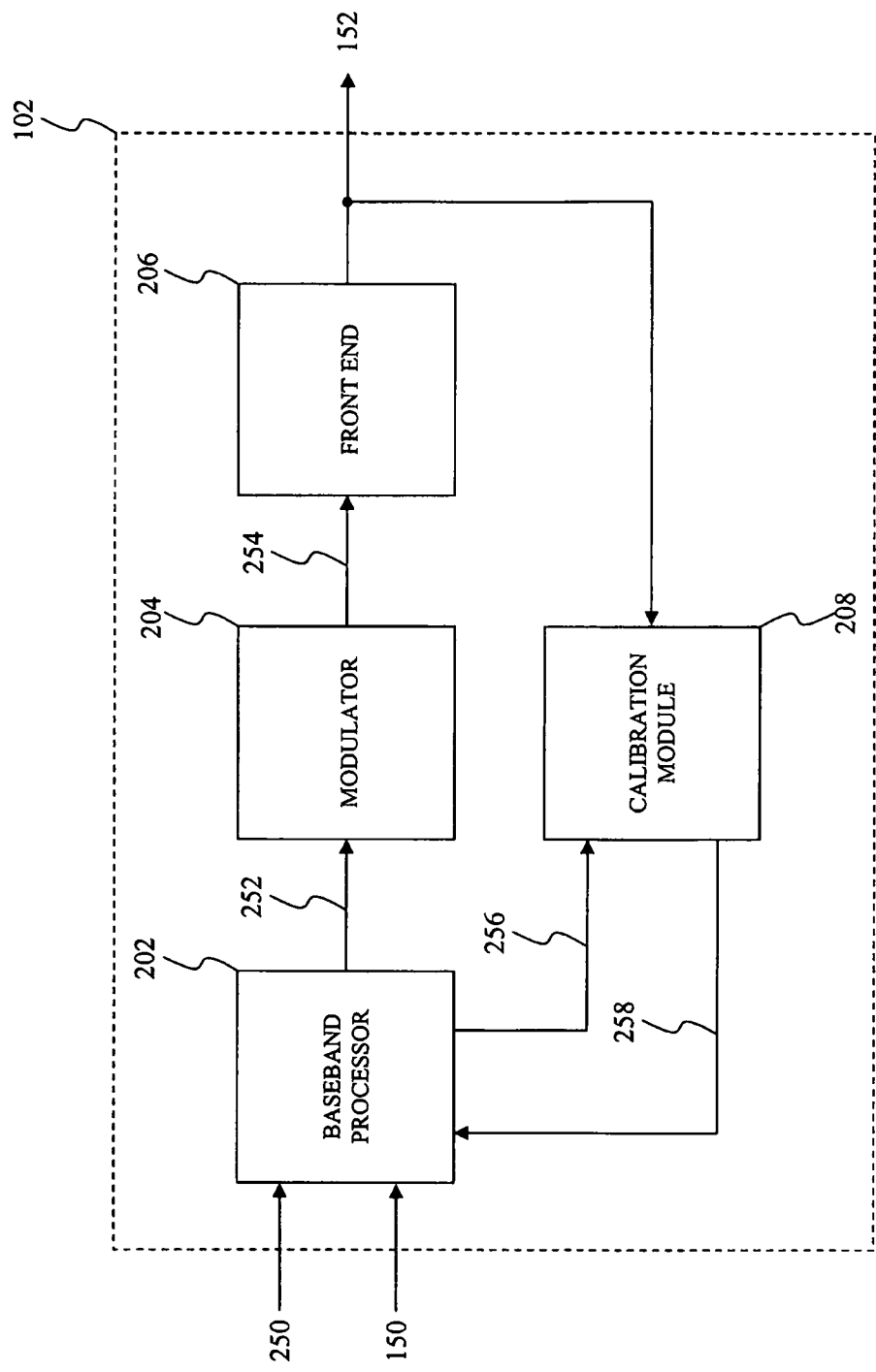
FIG. 2 illustrates a block diagram of a communications transmitter used in the communications environment according to an exemplary embodiment of the present invention.

FIG. 2 illustrates a block diagram of a communications transmitter used in the communications environment according to an exemplary embodiment of the present invention. As shown in FIG. 2, the communications transmitter 102 includes a baseband processor 202, a modulator 204, a front end 206, and a calibration module 208. The baseband processor 202 processes the one or more information signals 150 using one or more digital processing functions to provide a processed sequence of data 252 in a normal mode of operation. In an exemplary embodiment, the processed sequence of data 252 represents a quadriphase signal including an in-phase processed sequence of data 252a and a quadrature phase processed sequence of data 252b. The one or more digital processing functions may include, but are not limited to, interleaving, source encoding, channel encoding, digital filtering, formatting, and/or any other suitable digital processing of the one or more information signals 150 that will be apparent to those skilled in the relevant art(s). Alternatively, the baseband processor 202 processes one or more calibration signals 250 using the one or more digital processing functions to provide the processed sequence of data 252 in a calibration mode of operation. The one or more calibration signals 250 may be provided to the baseband processor 202 and/or internally produced by the baseband processor 202.

The modulator 204 processes the processed sequence of data 252 using one or more first analog processing functions to provide a modulated communications signal 254. The one or more first analog processing functions may include, but are not limited to, digital to analog converting, analog filtering, frequency translating, multiplexing, and/or any other suitable analog processing of the processed sequence of data 252 that will be apparent to those skilled in the relevant art(s). The modulator 204 is described in further detail below in FIG. 3.

The front end 206 processes the processed modulated communications signal 254 using one or more second analog processing functions to provide the transmitted communications signal 152. The one or more second analog processing functions may include, but are not limited to, amplification, impedance matching for one or more antennas, analog filtering, and/or any other suitable function that causes the modulated communications signal 254 to be more suitable for transmission.

The calibration module 208 operates in one of the calibration mode of operation and the normal mode of operation based upon a mode select 256. In the calibration mode of operation, the baseband processor 202 configures the mode select 256 to cause the calibration module 208 to be active or "turned on." Alternatively, the baseband processor 202 configures the mode select 256 to cause the calibration module 208 to be inactive or "turned off" in the normal mode of operation.

In the calibration mode of operation, the baseband processor 202 selects the one or more calibration signals 250 to allow for optimization of the one or more statistical parameters. The calibration module 208 determines one or more statistical parameters, such as a mean, a total energy, an average power, a mean square, an instantaneous power, a root mean square, a variance, a norm, a voltage level, an image rejection ratio, a local oscillator (LO) rejection ratio, a direct current (DC) offset rejection, and/or any other suitable statistical parameter that will be apparent to those skilled in the relevant art(s), of the transmitted communications signal 152 in response to the one or more calibration signals 250. The calibration module 208 provides one or more compensation parameters 258 indicative of the one or more statistical parameters to the baseband processor module 202. The baseband processor 202 adjusts the one or more operational parameters of the communications transmitter 102 in response to the one or more compensation parameters 258. As a result, the undesirable noise and/or interference embedded within the transmitted communications signal 152 either increases, decreases, or remains substantially the same.

The calibration module 208 and the baseband processor 202 continue to determine the one or more statistical parameters and to adjust the one or more operational parameters in a similar manner until the one or more statistical parameters are optimized. The calibration module 208 then adjusts the one or more operational parameters of the communications transmitter 102 using one or more optimized sets of the one or more compensation parameters 258 for transmission of the transmitted communications signal 152 in the normal mode of operation.

Modulator

Figure 3:
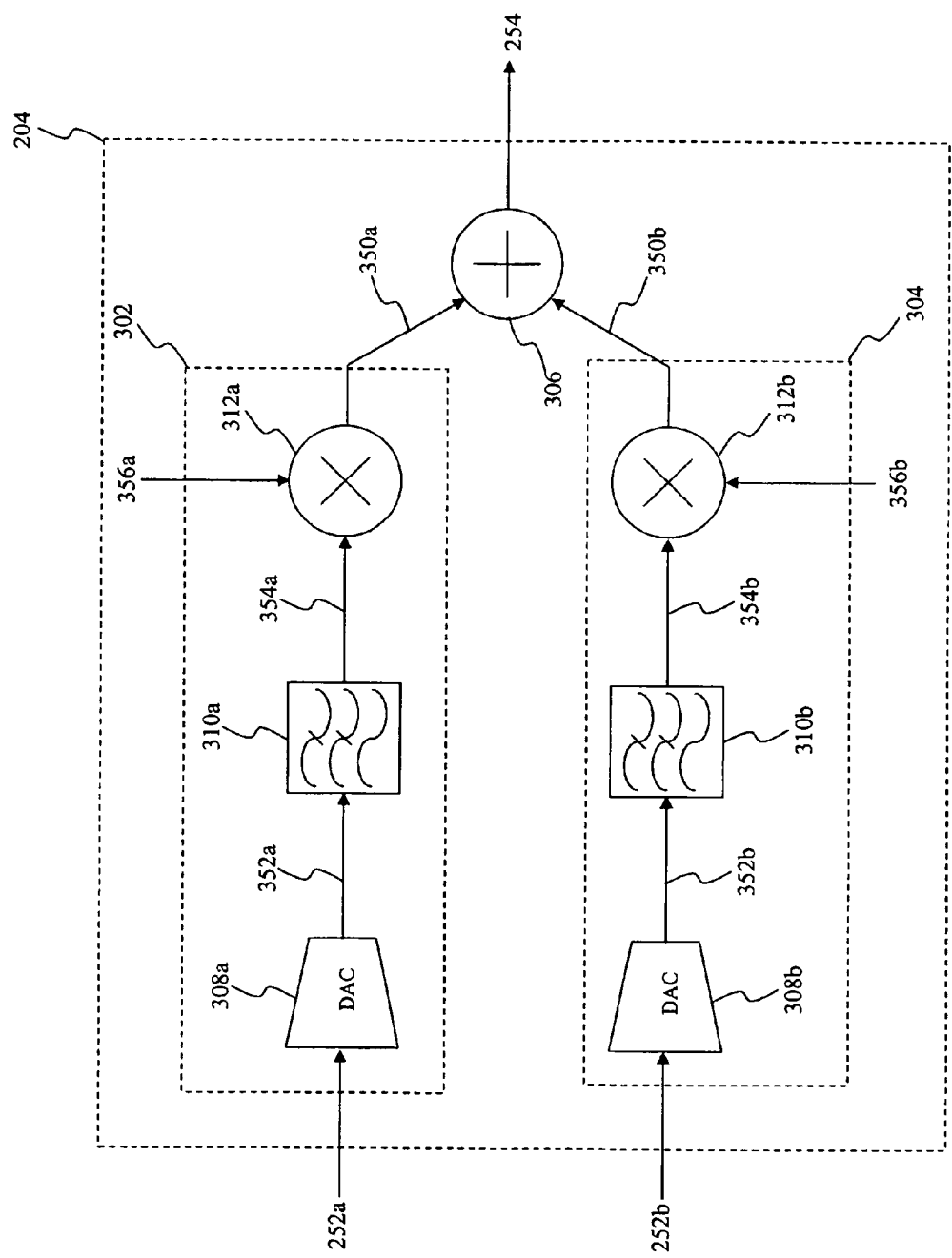
FIG. 3 illustrates a block diagram of a modulator used in the communications transmitter used according to an exemplary embodiment of the present invention.

FIG. 3 illustrates a block diagram of a modulator used in the communications transmitter used according to an exemplary embodiment of the present invention. The modulator 204 frequency translates the in-phase processed sequence of data 252a with a first transmitter carrier wave 356a and the quadrature phase processed sequence of data 252b with a second transmitter carrier wave 356b to provide an in-phase communications signal 350a and a quadrature phase communications signal 350b, respectively. The modulator 204 combines the in-phase communications signal 350a and the quadrature phase communications signal 350b to provide the modulated communications signal 254.

As shown in FIG. 3, the modulator 204 includes an in-phase transmitter processing branch 302, a quadrature phase transmitter processing branch 304, and a combination module 306. The in-phase transmitter processing branch 302 provides the in-phase communications signal 350a based upon the in-phase processed sequence of data 252a. Likewise, the quadrature phase transmitter processing branch 304 provides the quadrature phase communications signal 350b based upon the quadrature phase processed sequence of data 252b.

The in-phase transmitter processing branch 302 includes a digital-to-analog converter (DAC) 308a, a low pass filter 310a, and a mixer 312a. The DAC 308a converts the in-phase processed sequence of data 252a from a digital representation to an analog representation to provide an analog sequence of data 352a.

The low pass filter 310a filters the analog sequence of data 352a in accordance with a filter transfer function to provide a filtered sequence of data 354a. The filter transfer function may represent a passive low pass filter transfer function, such as a Butterworth, a Cauer, a Chebyshev, and/or any other suitable passive filter transfer function that will be apparent to those skilled in the relevant art(s), an active low pass filter transfer function such as a Sallen-Key and/or any other suitable active filter transfer function that will be apparent to those skilled in the relevant art(s), or any suitable combination of the passive low pass filter transfer function and the active low pass filter transfer function.

The mixer 312a frequency translates or upconverts the filtered sequence of data 354a using the first transmitter carrier wave 356a to provide the in-phase communications signal 350a. Mathematically, the first transmitter carrier wave 356a may be denoted as:

$$\cos(2\pi f_{LO} t), \quad (1)$$

wherein $f_{LO}$ represents a frequency of the first carrier wave 356a. The mixer 312a may frequency translate the filtered sequence of data 354a to the frequency $f_{LO}$ to provide the provide in-phase communications signal 350a.

The quadrature phase transmitter processing branch 304 operates in a substantially similar manner as the in-phase transmitter processing branch 302. Therefore, only differences between the in-phase transmitter processing branch 302 and the quadrature phase transmitter processing branch 304 will be discussed in further detail.

The mixer 312b frequency translates or upconverts the filtered sequence of data 354b using the second transmitter carrier wave 356b to provide the quadrature phase communications signal 350b. The first transmitter carrier wave 356a and the second transmitter carrier wave 356b are substantially similar in frequency but are offset in phase by approximately 90-degrees from one another. Mathematically, the second transmitter carrier wave 356b may be denoted as:

$$\sin(2\pi f_{LO} t), \quad (2)$$

wherein $f_{LO}$ represents a frequency of the second carrier wave 356b.

The combination module 306 combines the in-phase communications signal 350a and the quadrature phase communications signal 350b to provide the modulated communications signal 254.

Imperfections within the Communications Transmitter

From the discussion above, the one or more imperfections within the communications transmitter 102 embed the undesirable noise and/or interference onto the transmitted communications signal 152. The one or more imperfections within the communications transmitter 102 may include one or more unwanted offsets and/or an undesirable phase offset between the first transmitter carrier wave 356a and the second transmitter carrier wave 356b to provide some examples. For example, the one or more imperfections may arise from differences between amplitude and/or phase responses of the in-phase transmitter processing branch and quadrature phase transmitter processing branch and/or one or more unwanted offsets that accumulate between these two processing branches. However, these examples are not limiting, those skilled in the relevant art(s) will recognize that other imperfections are possible without departing from the spirit and scope of the present invention.

Unwanted DC Offsets within the Communications Transmitter

Figure 4A:
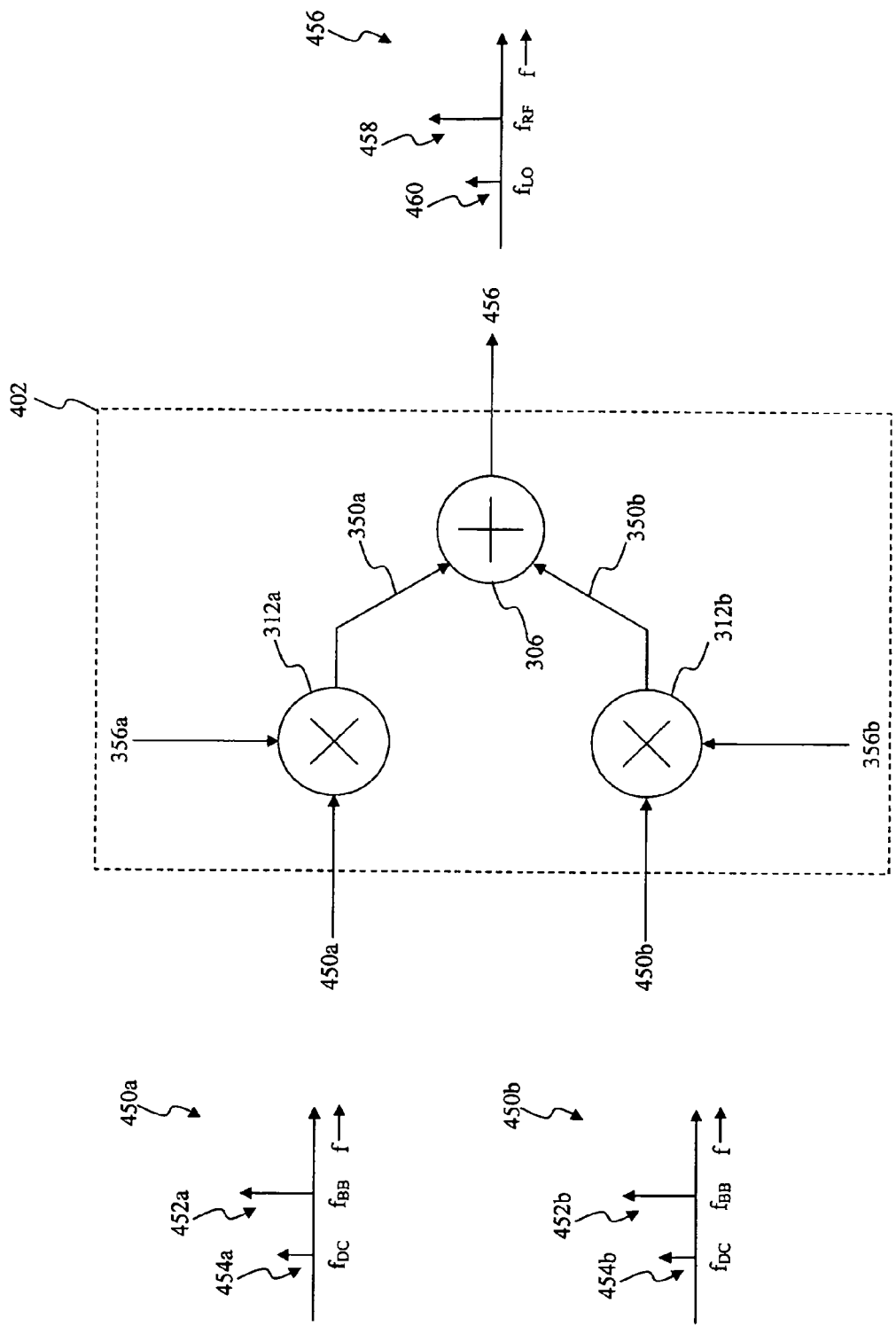
FIG. 4A illustrates a first imperfection of the communications transmitter according to an exemplary embodiment of the present invention.

FIG. 4A illustrates a first imperfection of the communications transmitter according to an exemplary embodiment of the present invention. The first imperfection represents one or more unwanted offsets having electromagnetic energy with a frequency of approximate zero Hertz, commonly referred to as direct current (DC) offsets. The one or more unwanted DC offsets are frequency translated to the frequency of the first transmitter carrier wave 356a and/or the frequency of the second transmitter carrier wave 356b by the modulator 204. The one or more unwanted DC offsets may be produced by the baseband processor 202 processing of the one or more information signals 150, the DAC 308 converting of the phase processed sequence of data 252, and/or the low pass filter 310 filtering of the analog sequence of data 352 and/or may be produced by direct coupling of signals of the quadrature phase transmitter processing branch 304 onto signals of the in-phase transmitter processing branch 302 and/or direct coupling of signals of the in-phase transmitter processing branch onto signals of the quadrature phase transmitter processing branch 304.

For example, as shown in FIG. 4A, an in-phase sequence of data 450a and a quadrature phase sequence of data 450b are frequency translated by the mixer 312a and the mixer 312b, respectively, within a modulator 402. The modulator 402 may represent a portion of the modulator 204 as discussed above in FIG. 2 and FIG. 3. The in-phase sequence of data 450a includes an in-phase desired signal of interest 452a and an unwanted DC offset 454a. Likewise, the quadrature phase sequence of data 450b includes a quadrature phase desired signal of interest 452b and an unwanted DC offset 454b. The in-phase desired signal of interest 452a and the quadrature phase signal of interest 452b represent in-phase and quadrature phase information, respectively, to be transmitted by the communications transmitter 102, such as in-phase and quadrature phase components of the one or more information signals 150 to provide an example.

For illustrative purposes only, the in-phase desired signal of interest 452a and the quadrature phase signal of interest 452b each may be characterized by electromagnetic energy having a frequency of approximately $f_{BB}$. Those skilled in the relevant arts will recognize that the in-phase desired signal of interest 452a and the quadrature phase signal of interest 452b may be characterized by electromagnetic energy having different frequencies or combination(s) of different frequencies without departing from the spirit and scope of the present invention.

The unwanted DC offset 454a represents a first unwanted DC offset from among the one or more unwanted DC offsets corresponding to the in-phase transmitter processing branch 302, and the unwanted DC offset 454b represents a second unwanted DC offset from among the one or more unwanted DC offsets corresponding to the quadrature phase transmitter processing branch 304. Mathematically, the in-phase sequence of data 450a may be represented as:

$$A_1 \cos(2\pi f_{BB} t) + e_i, \quad (3)$$

where $A_1 \cos(2\pi f_{BB} t)$ represents the in-phase desired signal of interest 452a characterized by an amplitude of $A_1$ and a frequency of $f_{BB}$, and $e_i$ represents the unwanted DC offset 454a. Likewise, the quadrature phase sequence of data 450b may be represented as:

$$A_2 \sin(2\pi f_{BB} t) + e_q, \quad (4)$$

where $A_2 \sin(2\pi f_{BB} t)$ represents the quadrature phase desired signal of interest 452b characterized by an amplitude of $A_2$ and a frequency of $f_{BB}$ and $e_q$ represents the unwanted DC offset 454b. The unwanted DC offset 454b may be similar to or dissimilar to the unwanted DC offset 454a.

The mixer 312a frequency translates the in-phase sequence of data 450a using the first transmitter carrier wave 356a to provide the in-phase communications signal 350a. More specifically, the mixer 312a frequency translates both the in-phase desired signal of interest 452a and the unwanted DC offset 454a using the first transmitter carrier wave 356a. Similarly, the mixer 312b frequency translates the quadrature phase sequence of data 450b using the second transmitter carrier wave 356b to provide the quadrature phase communications signal 350b. More specifically, the mixer 312b frequency translates both the quadrature phase desired signal of interest 452b and the unwanted DC offset 454b using the second transmitter carrier wave 356b.

The combination module 306 combines the in-phase communications signal 350a and the quadrature phase communications signal 350b to provide a modulated communications signal 456. The modulated communications signal 456 includes a frequency translated desired signal of interest 458 and an unwanted LO offset 460. The frequency translated desired signal of interest 458 represents information, such as the one or more information signals 150, that has been frequency translated to a frequency of $f_{RF}$ for transmission over the communication channel 104. More specifically, the frequency translated desired signal of interest 458 represents the in-phase sequence of data 450a and the quadrate phase sequence of data 450b that have been frequency translated to the frequency of $f_{LO}$ and combined together. The unwanted LO offset 460 represents the undesirable noise and/or interference embedded within the modulated communications signal 456. In particular, the unwanted LO offset 460 represents the unwanted DC offset 454a and the unwanted DC offset 454b that also have been frequency translated to the frequency of $f_{LO}$ and combined together. Mathematically, the modulated communications signal 456 may be represented as:

$$A_3 \cos(2\pi(f_{BB}+f_{LO})t) + \sqrt{e_i^2+e_q^2} \cos(2\pi f_{LO} t + \theta), \quad (5)$$

where $A_3 \cos(2\pi(f_{BB}+f_{LO})t)$ represents the frequency translated desired signal of interest 458 characterized by an amplitude of $A_3$ and a frequency of $f_{BB}+f_{LO}$, denoted as $F_{RF}$, and $\sqrt{e_i^2+e_q^2}\cos(2\pi f_{LO}t+\theta)$ represents the unwanted LO offset 460 characterized by an amplitude of $\sqrt{e_i^2+e_q^2}$, a frequency of $f_{LO}$, and a phase of $\theta$.

The unwanted LO offset 460 may cause the communication receiver 106 to incorrectly determine the transmitted sequence of modulation symbols of the transmitted communications signal 152, thereby degrading the ability of the communications receiver 106 to recover the one or more recovered information signals 156 from the received communications signal 154. However, reducing the unwanted LO offset 460 by reducing the unwanted DC offset 454a and/or the unwanted DC offset 454b increases the likelihood that the communication receiver 106 will correctly determine the transmitted sequence of modulation symbols of the transmitted communications signal 152.

Undesirable Phase Offset θ within the Communications Transmitter

Figure 4B:
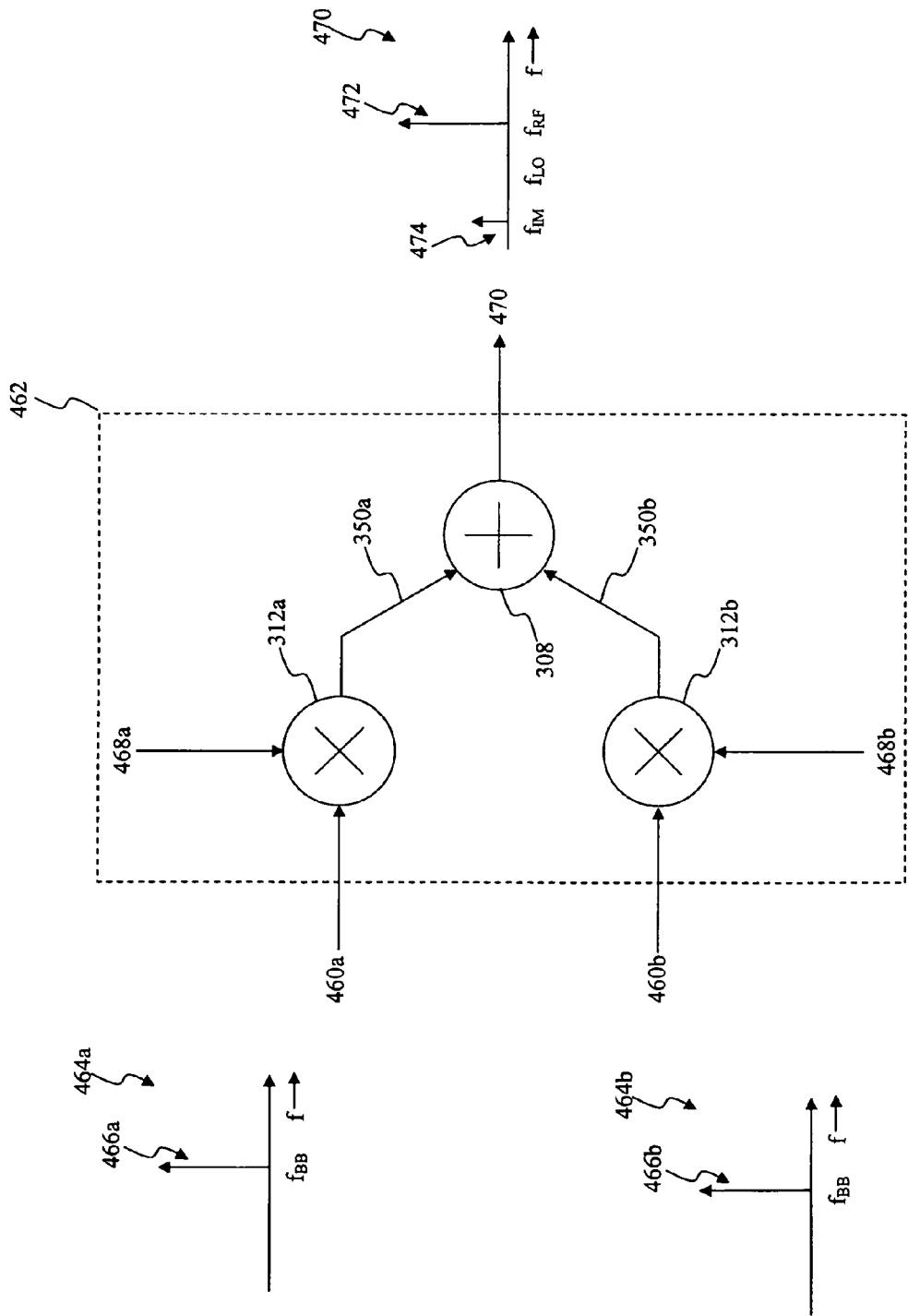
FIG. 4B illustrates a second imperfection of the communications transmitter according to an exemplary embodiment of the present invention.

FIG. 4B illustrates a second imperfection of the communications transmitter according to an exemplary embodiment of the present invention. The second imperfection within the communications transmitter 102 may result from an undesirable phase offset θ between the first transmitter carrier 356a wave and the second transmitter carrier wave 356b to provide an example.

For example, as shown in FIG. 4B, an in-phase sequence of data 464a is frequency translated using a first transmitter carrier wave 468a by the mixer 312a within a modulator 462. Similarly, a quadrature phase sequence of data 464b is frequency translated using a second transmitter carrier wave 468b by the mixer 312b within the modulator 462. The modulator 462 may represent a portion of the modulator 204 as discussed above in FIG. 2 and FIG. 3.

The in-phase sequence of data 464a and the quadrature phase sequence of data 464b include an in-phase desired signal of interest 466a and a quadrature phase desired signal of interest 466b, respectively. The in-phase desired signal of interest 466a and the quadrature phase signal of interest 466b represent in-phase and quadrature phase information, respectively, to be transmitted by the communications transmitter 102, such as in-phase and quadrature phase components of the one or more information signals 150 to provide an example.

For illustrative purposes only, the in-phase desired signal of interest 466a and the quadrature phase signal of interest 466b include electromagnetic energy characterized by a frequency of approximately $f_{BB}$. Those skilled in the relevant arts will recognize that the in-phase desired signal of interest 466a and the quadrature phase signal of interest 466b may include electromagnetic energy having different frequencies or combination(s) of different frequencies without departing from the spirit and scope of the present invention. Mathematically, the in-phase sequence of data 464a may be represented as:

$$A_1 \cos(2\pi f_{BB}t), \quad (6)$$

where $f_{BB}$ represents a frequency of the in-phase desired signal of interest 466a at baseband and $A_1$ represents an amplitude of the in-phase desired signal of interest 466a. Likewise, the quadrature phase sequence of data 464b may be represented as:

$$A_2 \sin(2\pi f_{BB}t), \quad (7)$$

where $f_{BB}$ represents a frequency of the quadrature phase desired signal of interest 466b at baseband and $A_2$ represents an amplitude of the quadrature phase desired signal of interest 466b.

The mixer 312a frequency translates the in-phase sequence of data 464a in-phase sequence of data 464a using the first transmitter carrier wave 468a to provide the in-phase communications signal 350a. Similarly, the mixer 312b frequency translates the quadrature phase sequence of data 464b using the second transmitter carrier wave 468b to provide the quadrature phase communications signal 350b. The first transmitter carrier wave 468a and the second transmitter carrier wave 468b are substantially similar to the first transmitter carrier wave 356a and the second transmitter carrier wave 356b, except that the first transmitter carrier wave 468a and the second transmitter carrier wave 468b are not substantially offset in phase by approximately 90 degrees. A phase difference between the first transmitter carrier wave 468a and the second transmitter carrier wave 468b may be represented as:

$$90°\pm\theta, \quad (8)$$

where θ represents a phase offset between the first transmitter carrier wave 468a and the second transmitter carrier wave 468b that is less than or greater than 90 degrees, herein referred to as the undesirable phase offset θ. Mathematically, the first transmitter carrier wave 468a may be represented as:

$$A_1 \cos(2\pi f_{LO}t), \quad (9)$$

while the second transmitter carrier wave 468b may be represented as:

$$A_2 \sin(2\pi f_{LO}t+\phi), \quad (10)$$

where $A_1$ and $A_2$ represent a magnitude of the first transmitter carrier wave 468a and the second transmitter carrier wave 468b, respectively, $f_{LO}$ represents the frequency of the first transmitter carrier wave 468a and the second transmitter carrier wave 468b, and $\phi$ represents the undesirable phase offset θ.

The combination module 306 combines the in-phase communications signal 350a and the quadrature phase communications signal 350b to provide a modulated communications signal 470. The modulated communications signal 470 may represent an exemplary embodiment of the transmitted communications signal 152. The modulated communications signal 470 includes a frequency translated desired signal of interest 472 and an unwanted image 474. The frequency translated desired signal of interest 472 represents information, such as the one or more information signals 150, that has been frequency translated to a frequency of $f_{LO}+f_{BB}$, denoted as $f_{RF}$ in FIG. 4B, for transmission over the communication channel 104.

The unwanted image 474 represents the undesirable noise and/or interference embedded within the modulated communications signal 470. More specifically, the unwanted image 474 represents an undesired or unwanted error signal having substantially similar electromagnetic energy as the in-phase desired signal of interest 466a and the quadrature phase signal of interest 466b that has been frequency translated to a frequency $f_{LO}-f_{BB}$, denoted as $f_{IM}$ in FIG. 4B. Mathematically, the modulated communications signal 470 may be represented as:

$$A_3 \cos(2\pi(f_{BB}+f_{LO})t)+A_4 \sin(2\pi(f_{BB}-f_{LO})t), \quad (11)$$

where $A_3 \cos(2\pi(f_{BB}+f_{LO})t)$ represents the frequency translated desired signal of interest 472 characterized by an amplitude of $A_3$ and a frequency of $f_{BB}\pm f_{LO}$, and $A_4 \sin(2\pi(f_{BB}-f_{LO})t)$ represents the unwanted image 474 characterized by an amplitude of $A_4$ and a frequency of $f_{BB}-f_{LO}$.

The unwanted image 474 may cause the communication receiver 106 to incorrectly determine the transmitted sequence of modulation symbols of the transmitted communications signal 152, thereby degrading the ability of the communications receiver 106 to recover the one or more recovered information signals 156 from the received communications signal 154. However, reducing the unwanted image 474 by adjusting a phase of the in-phase processed sequence of data 252a and/or a phase of the quadrature phase processed sequence of data 252b, or alternately adjusting a phase of the first transmitter carrier wave 468a and/or a phase the second transmitter carrier wave 468b, such that the unwanted image signal 474 is reduced. As a result, the likelihood that the communication receiver 106 will correctly determine the transmitted sequence of modulation symbols of the transmitted communications signal 152 is increased.

Figure 5:
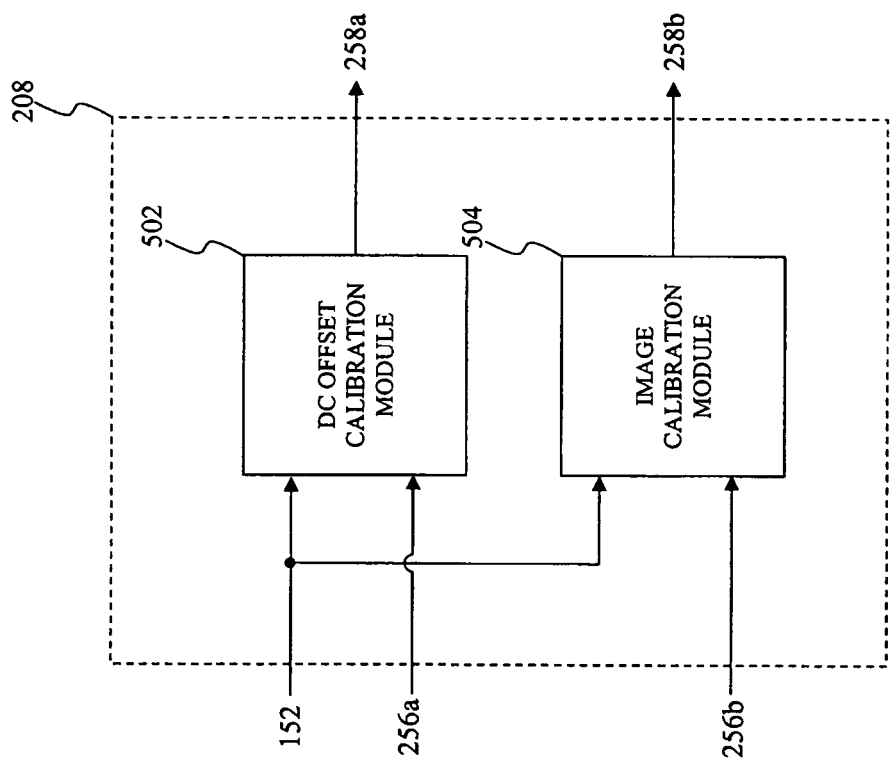
FIG. 5 illustrates a block diagram of a calibration module used in the communications transmitter according to an exemplary embodiment of the present invention.

Apparatus to Compensate for the Unwanted DC Offsets and/or the Undesirable Phase Offset θ within the Communications Transmitter The calibration module 208 determines one or more statistical parameters relating to the unwanted LO offset 460, as discussed in FIG. 4A, and/or the unwanted image 474, as discussed in FIG. 4B, each of which may be embedded within the transmitted communications signal 152. FIG. 5 illustrates a block diagram of a calibration module used in the communications transmitter according to an exemplary embodiment of the present invention. As shown in FIG. 5, the calibration module 208 includes a DC offset compensation module 502 and an image calibration module 504.

Compensation for the Unwanted DC Offsets

The baseband processor configures the mode select 256a to cause the DC offset compensation module 502 to be active or "turned on" and the mode select 256b to cause the image calibration module 504 to be inactive or "turned off" to compensate for the unwanted DC offsets. The baseband processor selects an offset calibration signal from among the one or more calibration signals 250. The offset calibration signal causes the unwanted LO offset 460 to be embedded within the transmitted communications signal 152 in the presence of the unwanted DC offset 454a and the unwanted DC offset 454b, as discussed in FIG. 4A. In this exemplary embodiment, the baseband processor 202 selects a digital logic value of zero as the offset calibration signal. This exemplary embodiment allows the DC offset compensation module 502 to determine the one or more statistical parameters relating to the unwanted LO offset 460 only in the presence of the unwanted LO offset 460.

The DC offset compensation module 502 determines one or more statistical parameters relating to the unwanted LO offset 460. The DC offset compensation module 502 then provides a first compensation parameter 258a indicative of the one or more statistical parameters relating to the unwanted LO offset 460 to the baseband processor module 202.

Figure 6:
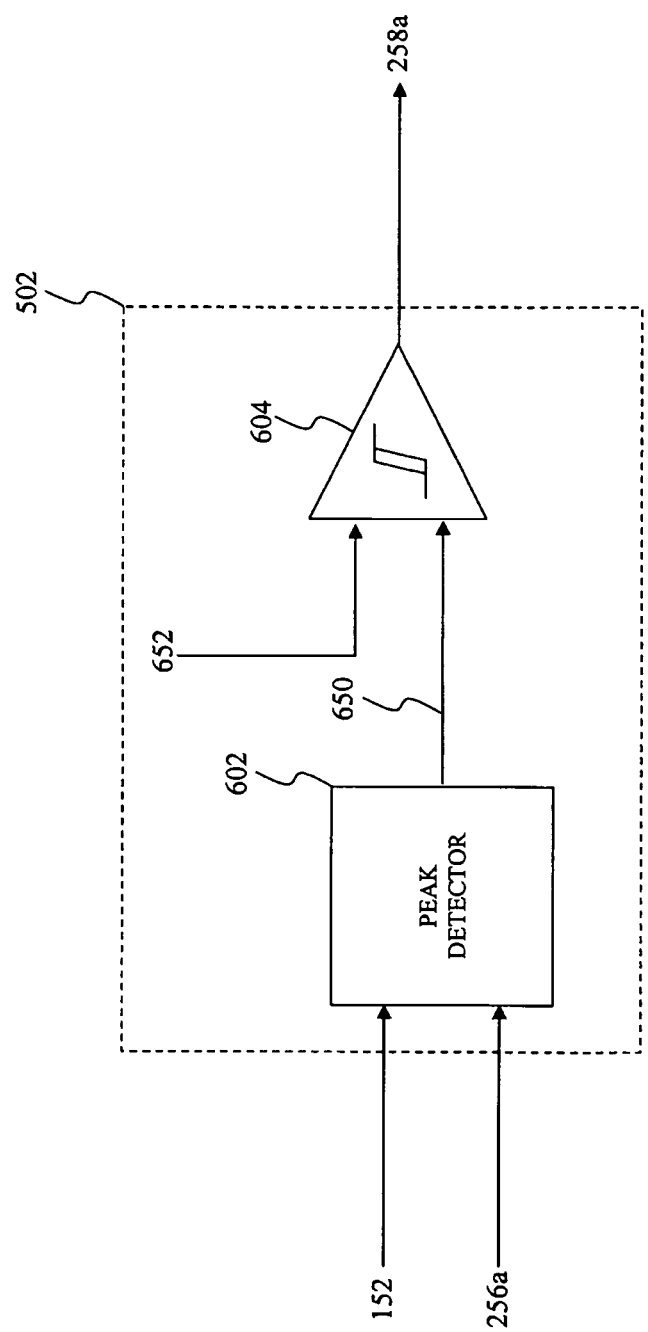
FIG. 6 illustrates a block diagram of a DC offset compensation module used in the calibration module according to an exemplary embodiment of the present invention.

FIG. 6 illustrates a block diagram of a DC offset compensation module used in the calibration module according to an exemplary embodiment of the present invention.

As shown in FIG. 6, the DC offset compensation module 502 includes a peak detector 602 and a comparator 604. The peak detector 602 measures a peak value 650 of the unwanted LO offset 460. More specifically, the peak detector 602 provides a direct current (DC) voltage representing the unwanted LO offset 460 as the peak value 650.

The comparator 604 compares the maximum noise value 650 to a DC offset threshold 652 to provide the first compensation parameter 258a. The DC offset threshold 652 may represent a maximum value of the unwanted LO offset 460 so that the communications receiver 106 may adequately recover the one or more recovered information signals 156 from the received communications signal 154. For example, the DC offset threshold 652 represents a maximum value of the unwanted LO offset 460 for which a bit error ratio (BER), a symbol error ratio (SER), a signal to noise ratio (SNR) or any other suitable signal parameter of the communications receiver 106 is sufficient to allow the communications receiver 106 to recover the one or more recovered information signals 156 from the received communications signal 154. Alternatively, the DC offset threshold 652 may be defined by a communications standard, such as the Bluetooth Specification, of which version 3.0+HS is the latest. The Bluetooth Specification version: 3.0+HS is incorporated by reference herein in its entirety.

The comparator 604 provides an indication as to whether the peak value 650 exceeds the DC offset threshold 652 as the first compensation parameter 258a. More specifically, the comparator 604 provides the first compensation parameter 258a having a first voltage level when the peak value 650 is greater than the DC offset threshold 652. Alternatively, the comparator 604 provides the first compensation parameter 258a having a second voltage level when the peak value 650 is less than the DC offset threshold 652.

The baseband processor 202 adjusts an in-phase DC compensation offset and/or a quadrature phase DC compensation offset within the in-phase processed sequence of data 252a and/or the quadrature phase processed sequence of data 252b, respectively. Typically, the in-phase DC compensation offset effectively reduces the unwanted DC offset 454a while the quadrature phase DC compensation offset effectively reduces the unwanted DC offset 454b. The baseband processor 202 increases and/or decreases the in-phase DC compensation offset and/or the quadrature phase DC compensation offset when the first compensation parameter 258a is at the first voltage level. As a result, the unwanted LO offset 460 either increases, decreases, or remains substantially the same.

The baseband processor 202 and the DC offset compensation module 502 continue to measure the peak value 650 of the unwanted LO offset 460 and to adjust the in-phase DC compensation offset and/or the quadrature phase DC compensation offset until the first compensation parameter 258a reaches the second voltage level, reflecting that the unwanted LO offset 460 is below the DC offset threshold 652. In an exemplary embodiment, an amount of the increase and/or the decrease of the in-phase DC compensation offset and/or the quadrature phase DC compensation offset is determined in accordance with a binary search. When the first compensation parameter 258a reaches the second voltage level, the unwanted LO offset 460 is sufficiently optimized to allow the communications receiver 106 to adequately recover the one or more recovered information signals 156 from the received communications signal 154. The baseband processor then configures the mode select 256a to cause the DC offset compensation module 502 to be inactive or "turned off" and the mode select 256b to cause the image calibration module 504 to be active or "turned on."

Referring back to FIG. 5, the baseband processor then selects an image calibration signal from among the one or more calibration signals 250. In an exemplary embodiment, the image calibration signal is characterized by a single frequency, commonly referred to as a tone. The image calibration signal causes the unwanted image 474 to be embedded within the transmitted communications signal 152 when the phase of the first transmitter carrier wave 356a and the phase the second transmitter carrier wave 356b are offset by the undesirable phase offset θ, as discussed in FIG. 4B.

Compensation for the Undesirable Phase θ Offset

The baseband processor selects an image calibration signal from among the one or more calibration signals 250. The undesirable phase offset θ causes the unwanted image 474 to be embedded within the transmitted communications signal 152 in response to the images calibration signal, as discussed in FIG. 4B.

The image calibration module 504 determines the one or more statistical parameters relating to the unwanted image 474. In an exemplary embodiment, the image calibration module 504 determines an image rejection ratio, namely a difference between a frequency translated representation of the image calibration signal and the unwanted image 474. The image calibration module 504 then provides a second compensation parameter 258*b* indicative of the one or more statistical parameters relating to the unwanted image 474 to the baseband processor module 202.

Figure 7A:
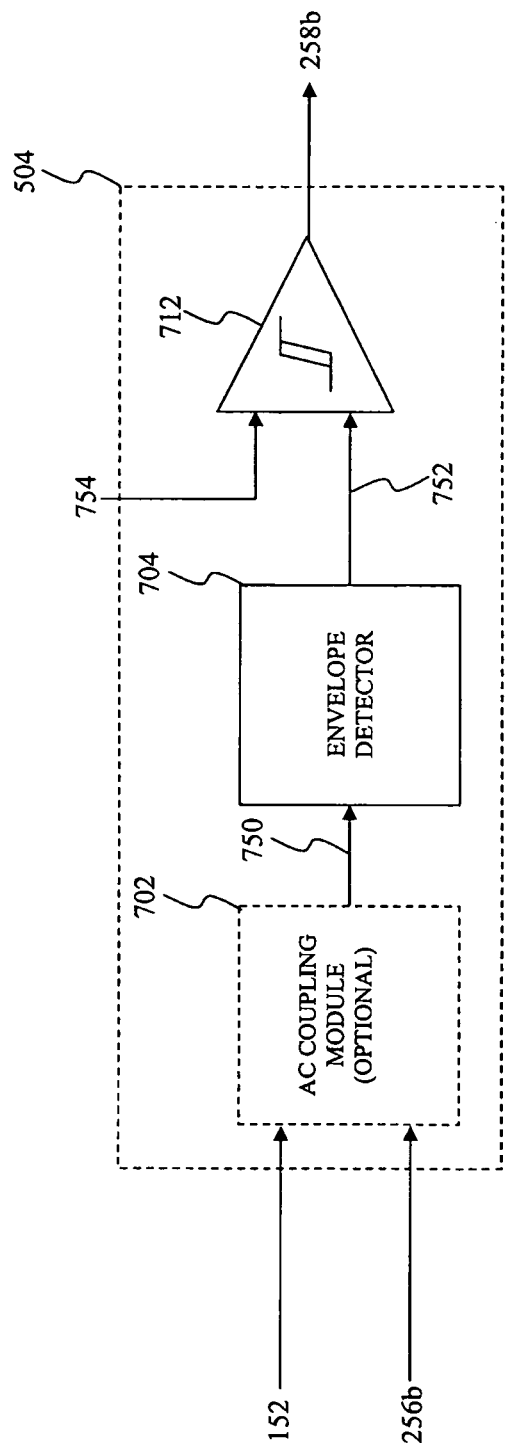
FIG. 7A illustrates a first block diagram of an image calibration module used in the calibration module according to a first exemplary embodiment of the present invention.

FIG. 7A illustrates a first block diagram of an image calibration module used in the calibration module according to a first exemplary embodiment of the present invention. The image calibration module 504 includes an optional alternating current (AC) coupling module 702, an envelope detector 704, and a comparator 706. The optional AC coupling module 702 substantially removes frequency components embedded within the transmitted communications signal 152 characterized by a frequency of approximately zero Hertz, or DC, to provide an AC coupled communications signal 750. The optional AC coupling module 702 ensures that these components do not overwhelm the envelope detector 704. In an exemplary embodiment, the optional AC coupling module 702 is implemented using one or more capacitors.

The envelope detector 704 measures an envelope of the transmitted communications signal 152 and/or the AC coupled communications signal 750 to provide a peak envelope value 752 representing a peak value of the envelope of the transmitted communications signal 152 and/or the AC coupled communications signal 750. More specifically, the image calibration signal causes the transmitted communications signal 152 and/or the AC coupled communications signal 750 to have a substantially constant or time invariant envelope in the absence of the undesirable phase offset θ. However, in the presence of the undesirable phase offset θ, the transmitted communications signal 152 and/or the AC coupled communications signal 750 includes the frequency translated representation of the image calibration signal and the unwanted image 474. The frequency translated representation of the image calibration signal and the unwanted image 474 cause the envelope of the transmitted communications signal 152 and/or the AC coupled communications signal 750 to be non-constant or time varying, that is amplitude modulated (AM). The envelope detector 704 essentially measures this time varying envelope of the transmitted communications signal 152 and/or the AC coupled communications signal 750 and provides its respective maximum or peak value as the peak envelope value 752.

The comparator 706 compares the peak envelope value 752 to an image rejection threshold 754 to provide the second compensation parameter 258*b*. The image rejection threshold 754 may represent a maximum value of the unwanted image 474 so that the communications receiver 106 may adequately recover the one or more recovered information signals 156 from the received communications signal 154. For example, the image rejection threshold 754 represents a maximum value of the unwanted image 474 for which a bit error ratio (BER), a symbol error ratio (SER), a signal to noise ratio (SNR) or any other suitable signal parameter of the communications receiver 106 is sufficient to allow the communications receiver 106 to recover the one or more recovered information signals 156 from the received communications signal 154. Alternatively, the image rejection threshold 754 may be defined by a communications standard, such as the Bluetooth Specification, of which version 3.0+HS is the latest. The Bluetooth Specification version: 3.0+HS is incorporated by reference herein in its entirety.

The comparator 706 provides an indication as to whether the peak envelope value 752 exceeds the image rejection threshold 754 as the second compensation parameter 258*b*. More specifically, the comparator 706 provides the second compensation parameter 258*b* having a first voltage level when the peak envelope value 752 is greater than the image rejection threshold 754. Alternatively, the comparator 706 provides the second compensation parameter 258*b* having a second voltage level when the peak envelope value 752 is less than the image rejection threshold 754.

The baseband processor 202 adjusts a phase of the in-phase processed sequence of data 252*a* and/or a phase of the quadrature phase processed sequence of data 252*b*, or alternately a phase of the in-phase the first transmitter carrier wave 356*a* and/or a phase of the second transmitter carrier wave 356*b*, to substantially reduce the unwanted image signal 474. In other words, when the second compensation parameter 258*b* is at the first voltage level, the baseband processor 202 increases and/or decreases the phase of the in-phase processed sequence of data 252*a* and/or phase of the quadrature phase processed sequence of data 252*b* such that unwanted image signal 474 is reduced. Alternatively, the baseband processor 202 increases and/or decreases the phase of the in-phase the first transmitter carrier wave 356*a* and/or the second transmitter carrier wave 356*b* such that a difference between the phase of the in-phase the first transmitter carrier wave 356*a* and the phase of the quadrature phase the first transmitter carrier wave 356*b* more closely approximates 90 degrees when the second compensation parameter 258*b* is at the first voltage level. As a result, the unwanted image 474 either increases, decreases, or remains substantially the same.

The baseband processor 202 and the DC offset compensation module 502 continue to measure the envelope of the transmitted communications signal 152 and/or the AC coupled communications signal 750 and to adjust the phase of the in-phase processed sequence of data 252*a* and/or phase of the quadrature phase processed sequence of data 252*b* and/or the phase of the in-phase the first transmitter carrier wave 356*a* and/or the phase of the second transmitter carrier wave 356*b* until the second compensation parameter 258*b* reaches the second voltage level, reflecting that the unwanted image 474 is below the image rejection threshold 754. In an exemplary embodiment, an amount of the increase and/or the decrease of the phase of the in-phase processed sequence of data 252*a* and/or phase of the quadrature phase processed sequence of data 252*b* and/or the phase of the in-phase the first transmitter carrier wave 356*a* and/or a phase of the second transmitter carrier wave 356*b* is determined in accordance with a binary search. When the second compensation parameter 258*b* reaches the second voltage level, the unwanted image 474 is sufficiently optimized to allow the communications receiver 106 to adequately recover the one or more recovered information signals 156 from the received communications signal 154.

Figure 7B:
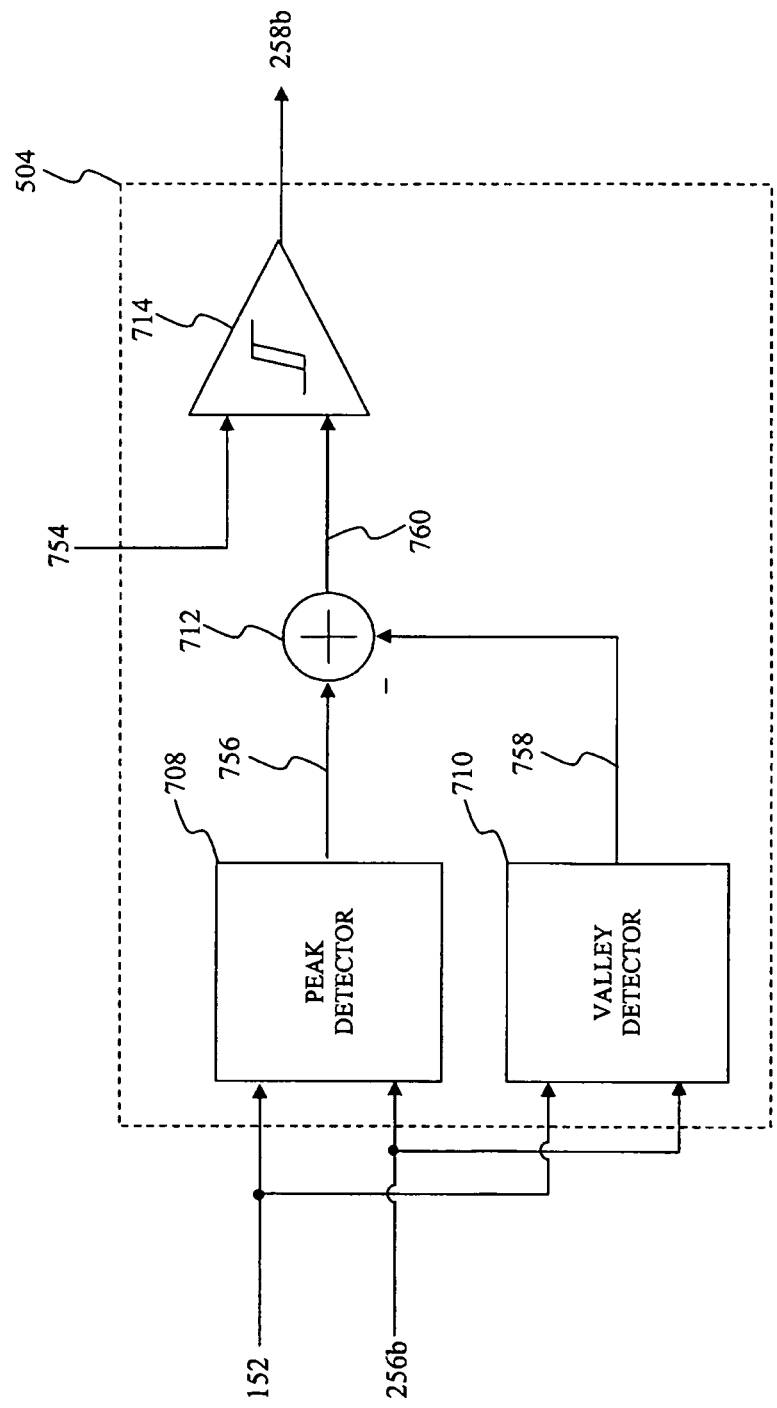
FIG. 7B illustrates a second block diagram of the image calibration module used in the calibration module according to a second exemplary embodiment of the present invention.

FIG. 7B illustrates a second block diagram of the image calibration module used in the calibration module according to a second exemplary embodiment of the present invention. The image calibration module 504 includes a peak detector 708, a valley detector 710, a combination module 712, and a comparator 714.

The transmitted communications signal 152 may be characterized by a maximum value, commonly referred to as a peak, and/or a minimum value, commonly referred to as a valley. The peak detector 708 provides a maximum value 756 indicative of the peak of transmitted communications signal 152. The valley detector 710 provides a minimum value 758 indicative of the valley of transmitted communications signal 152. In an exemplary embodiment, the peak detector 708 and the valley detector 710 provide a first direct current (DC) voltage as the maximum value 756 and a second DC voltage as the minimum value 758, respectively.

The combination module 712 combines the maximum value 756 and the minimum value 758 to provide a difference 760 representative of a difference between the maximum value 756 and the minimum value 758. More specifically, the combination module 712 essentially subtracts the minimum value 758 from the maximum value 756 to provide the difference 760. The difference between the maximum value 756 and the minimum value 758 of the transmitted communications signal 152 increases as a result of the unwanted image 474 in the presence of the undesirable phase offset θ when compared to the transmitted communications signal 152 without the undesirable phase offset θ. As a result, the difference 760 may be used as a measure of the unwanted image 474. For example, a greater undesirable phase offset θ results in a larger difference 760 while a lesser undesirable phase offset θ results in a smaller difference 760.

The comparator 714 compares an absolute value of the difference 760 to the image rejection threshold 754. The comparator 714 provides an indication as to whether the absolute value of the difference 760 exceeds the image rejection threshold 754 as the second compensation parameter 258b. More specifically, the comparator 714 provides the second compensation parameter 258b having a first voltage level when the absolute value of the difference 760 is greater than or equal to the image rejection threshold 754. Alternatively, the comparator 714 provides the second compensation parameter 258b having a second voltage level when absolute value of the difference 760 is less than the image rejection threshold 754.

The baseband processor 202 adjusts a phase of the in-phase processed sequence of data 252a and/or a phase of the quadrature phase processed sequence of data 252b, or alternately a phase of the in-phase the first transmitter carrier wave 356a and/or a phase of the second transmitter carrier wave 356b, to substantially reduce the unwanted image signal 474. In other words, the baseband processor 202 increases and/or decreases the phase of the in-phase processed sequence of data 252a and/or phase of the quadrature phase processed sequence of data 252b such that the unwanted image signal 474 is reduced when the second compensation parameter 258b is at the first voltage level. Alternatively, the baseband processor 202 increases and/or decreases the phase of the in-phase the first transmitter carrier wave 356a and/or the second transmitter carrier wave 356b such that a difference between the phase of the in-phase the first transmitter carrier wave 356a and the phase of the quadrature phase the first transmitter carrier wave 356b more closely approximates 90 degrees when the second compensation parameter 258b is at the first voltage level. As a result, the unwanted image 474 either increases, decreases, or remains substantially the same.

The baseband processor 202 and the image compensation module 504 continue to measure the envelope of the transmitted communications signal 152 and/or the AC coupled communications signal 750 and/or peak detector signal 756 and/or valley detector signal 758 and to adjust the phase of the in-phase processed sequence of data 252a and/or phase of the quadrature phase processed sequence of data 252b and/or the phase of the in-phase the first transmitter carrier wave 356a and/or the phase of the second transmitter carrier wave 356b until the second compensation parameter 258b reaches the second voltage level, reflecting that the unwanted image 474 is below the image rejection threshold 754. In an exemplary embodiment, an amount of the increase and/or the decrease of the phase of the in-phase processed sequence of data 252a and/or phase of the quadrature phase processed sequence of data 252b and/or the phase of the in-phase the first transmitter carrier wave 356a and/or a phase of the second transmitter carrier wave 356b is determined in accordance with a binary search. When the second compensation parameter 258b reaches the second voltage level, the unwanted image 474 is sufficiently optimized to allow the communications receiver 106 to adequately recover the one or more recovered information signals 156 from the received communications signal 154.

Figure 8:
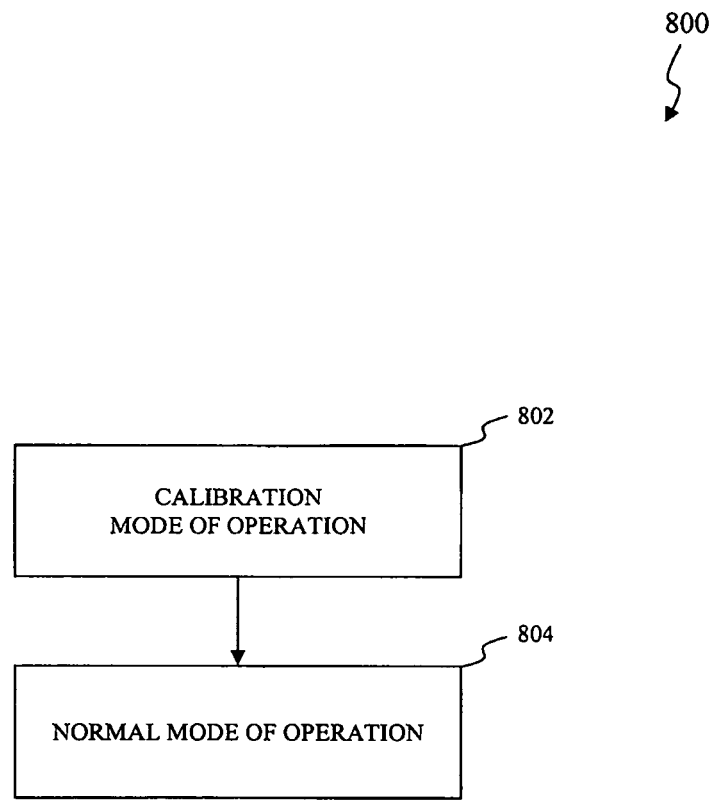
FIG. 8 is a flowchart of exemplary operational steps of the operation of a communications transmitter according to an exemplary embodiment of the present invention.

Method to Compensate for the Unwanted DC Offsets and/or the Undesirable Phase Offset θ within the Communications Transmitter FIG. 8 is a flowchart of exemplary operational steps of the operation of a communications transmitter according to an exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 8.

At step 802, the operational control flow enters into a calibration mode of operation to optimize one or more operational parameters of a communications transmitter, such as the communications transmitter 102 to provide an example. One or more imperfections within the communications transmitter may cause undesirable noise and/or interference, such as one or more unwanted DC offsets and/or unwanted LO offsets, to be embedded within a transmitted communications signal, such as the transmitted communications signal 152 to provide an example. In an exemplary embodiment, the operational control flow compensates for the one or more unwanted DC offsets prior to compensating for the unwanted LO offsets.

The operational control flow selects one or more calibration signals, such as the one or more calibration signals 250 to provide an example, to allow for optimization of one or more statistical parameters, such as a mean, a total energy, an average power, a mean square, an instantaneous power, a root mean square, a variance, a norm, a voltage level, an image rejection ratio, a local oscillator (LO) rejection ratio, a direct current (DC) offset rejection, and/or any other suitable statistical parameter that will be apparent to those skilled in the relevant art(s), of the transmitted communications signal in response to the one or more calibration signals.

The operational control flow measures the one or more statistical parameters then provides one or more compensation parameters indicative of the one or more statistical parameters. The operational control flow then adjusts one or more operational parameters, such as one or more direct current (DC) offsets, a phase response of the communications transmitter, and/or a phase of one or more transmitter carrier waves to provide some examples, in response to the one or more compensation parameters. As a result, the undesirable noise and/or interference embedded within the transmitted communications signal either increases, decreases, or remains substantially the same. The operational control flow continues to determine the one or more statistical parameters and to adjust the one or more operational parameters in a similar manner until the one or more statistical parameters are optimized.

At step 804, the operation control flow enters into a normal mode of operation to transmit one or more information signals, such as the one or more information signals 150 to provide an example, to a communications receiver via a communication channel. More specifically, the operational control flow adjusts the one or more operational parameters of the communications transmitter using one or more optimized sets of the one or more operational parameters as determined in the calibration mode of operation. The operation control flow then transmits of the transmitted communications signal in the normal mode of operation using the one or more optimized sets of the one or more operational parameters. The operational control flow may return to step 802 periodically to re-optimize the one or more operational parameters and/or to re-optimize the one or more operational parameters in response to an event, such as a temperature increase and/or decrease in the communications transmitter. The event may cause the undesirable noise and/or interference embedded within the transmitted communications signal to increase and/or decrease requiring the operation control flow to revert back to step 802.

Figure 9A:
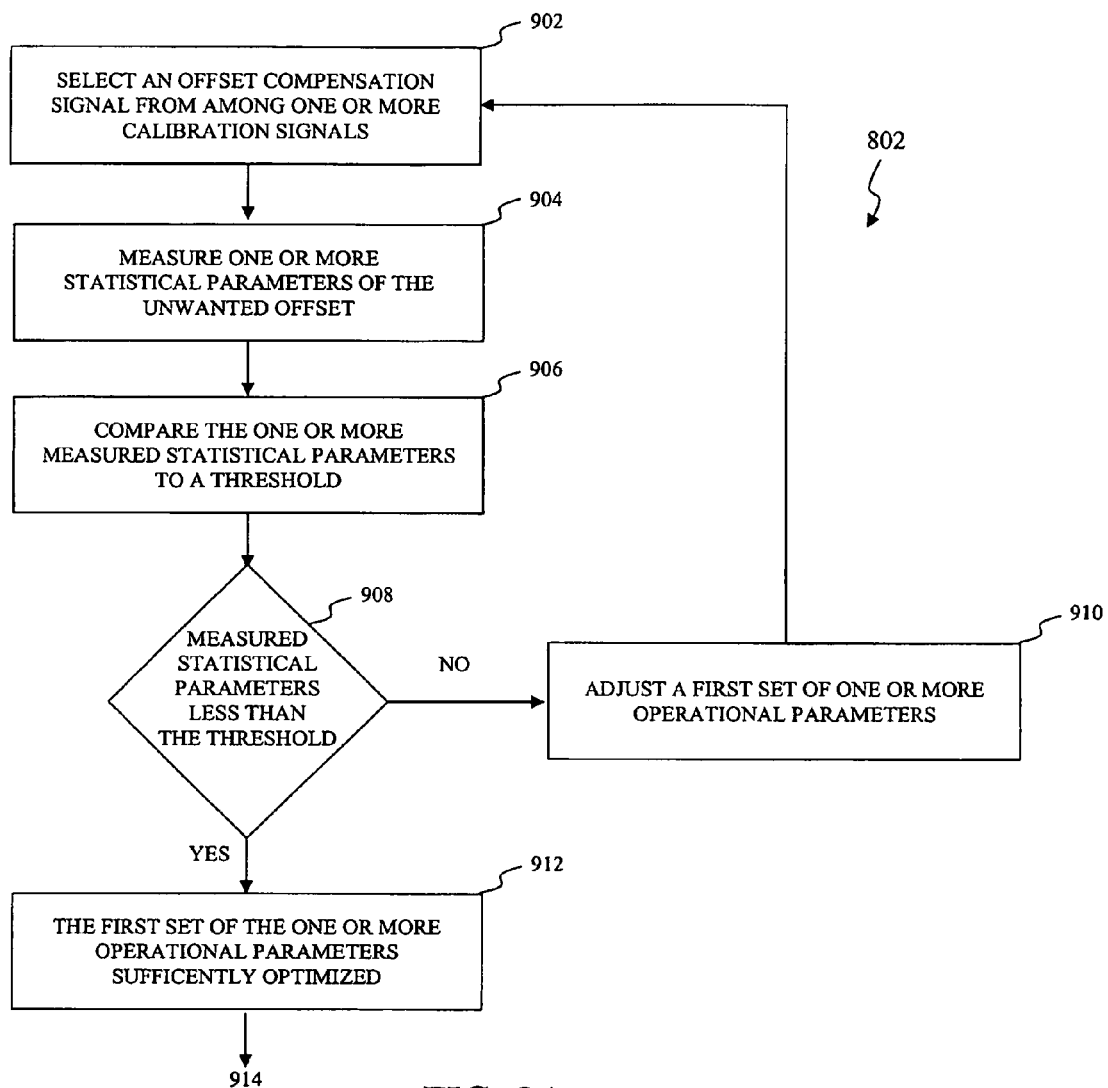
FIG. 9A and FIG. 9B are a flowcharts of exemplary operational steps of into a calibration mode of operation used in the communications transmitter according to an exemplary embodiment of the present invention.
Figure 9B:
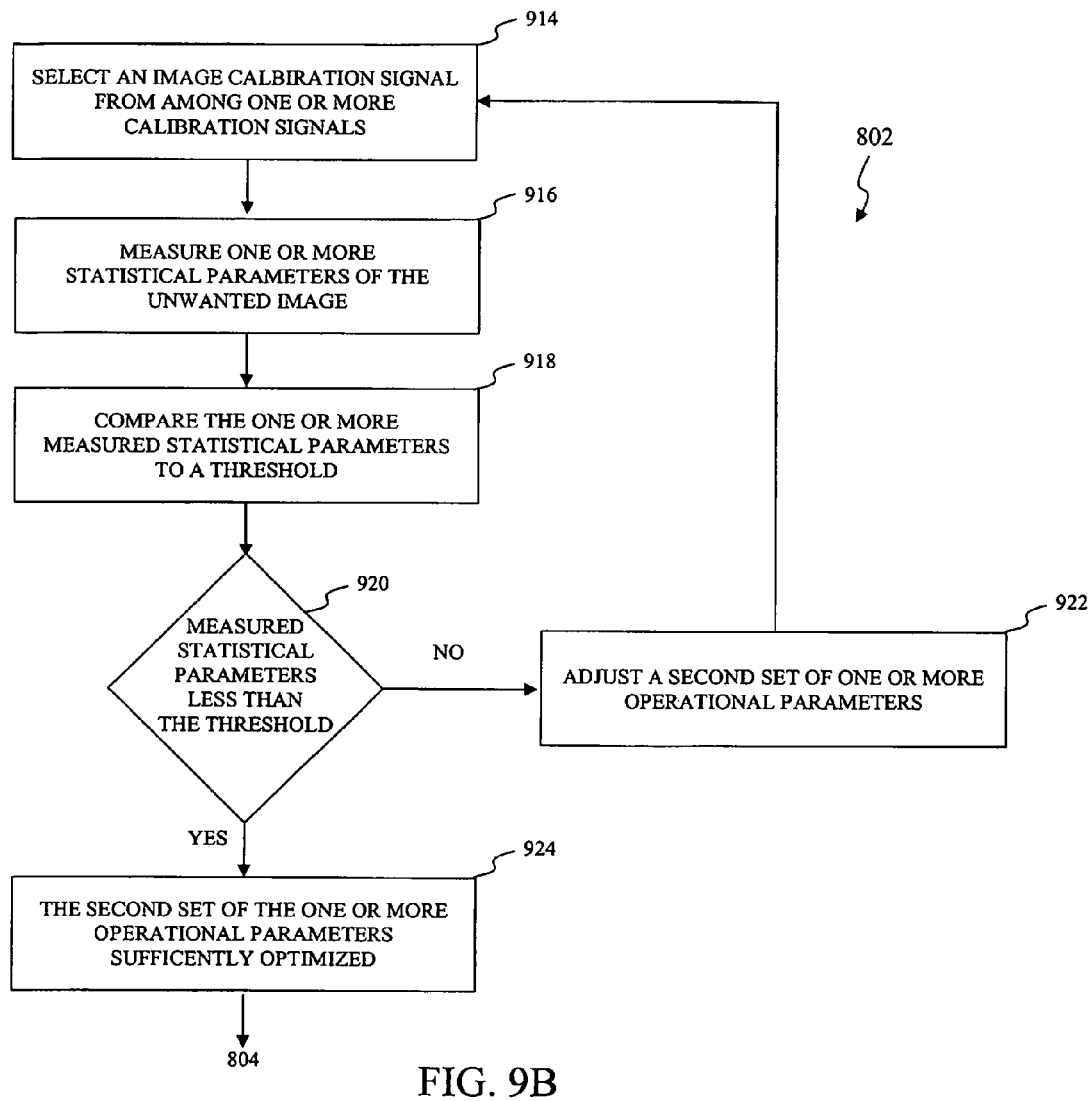

FIG. 9A and FIG. 9B are flowcharts of exemplary operational steps of into a calibration mode of operation used in the communications transmitter according to an exemplary embodiment of the present invention. FIG. 9A and FIG. 9B further describe step 802 as shown in FIG. 8. The invention is not limited to this operational description. Rather, it will be apparent to persons skilled in the relevant art(s) from the teachings herein that other operational control flows are within the scope and spirit of the present invention. The following discussion describes the steps in FIG. 9A and FIG. 9B.

At step 902, the operational control flow selects an offset compensation signal from the one or more calibration signals. In this exemplary embodiment, the operational control flow selects a digital logic value of zero as the offset calibration signal. This exemplary embodiment allows the operational control flow to determine the one or more statistical parameters relating to an unwanted local oscillator (LO) offset, such as the unwanted LO offset 460 to provide an example, only in the presence of the unwanted LO offset. The unwanted LO offset within the transmitted communications signal is caused by the presence of the one or more unwanted DC offsets, such as the unwanted DC offset 454a and/or the unwanted DC offset 454b to provide some examples, resulting from one or more imperfections of the communications transmitter.

At step 904, the operational control flow measures the one or more statistical parameters of the unwanted offset embedded within the transmitted communications signal in response to the offset compensation signal from step 902 to provide one or more measured statistical parameters, such as the peak value 650 to provide an example.

At step 906, the operational control flow compares the one or more measured statistical parameters from step 904 to a threshold, such as the DC offset threshold 652 to provide an example. The threshold may represent a maximum value of the unwanted LO offset so that the communications receiver may adequately recover the one or more recovered information signals from the received communications signal. Alternatively, the threshold may be defined by a communications standard, such as the Bluetooth Specification, of which version 3.0+HS is the latest. The Bluetooth Specification version: 3.0+HS is incorporated by reference herein in its entirety.

At step 908, the operational control flow proceeds to step 910 if the one or more measured statistical parameters from step 904 are less than the threshold. Else, the operation control flow proceeds to step 912.

At step 910, the operational control flow adjusts a first set of one or more operational parameters, such as the in-phase DC compensation offset or the quadrature phase DC compensation offset to provide some examples. The in-phase DC compensation offset and the quadrature phase DC compensation offset represent DC voltages introduced into the in-phase transmitter processing branch and the quadrature phase transmitter processing branch, respectively, to compensate for the unwanted LO offset. The operational control flow increases and/or decreases the first set of the one or more operational parameters. As a result, the unwanted LO offset from step 902 either increases, decreases, or remains substantially the same in response to this adjustment. In an exemplary embodiment, an amount of the increase and/or the decrease of the first set of the one or more operational parameters is determined in accordance with a binary search.

At step 912, the unwanted LO offset is sufficiently optimized to allow the communications receiver to adequately recover the one or more recovered information signals from the received communications signal. The operational control flow may proceed to step 914, to be further described in detail below in FIG. 9B, to optimize a second set of the one or more operational parameters, such as a phase of one or more transmitter carrier waves to provide an example, using one or more optimized sets of the first set of one or more operational parameters to optimize for an undesirable phase offset θ. The one or more optimized sets represent the first set of one or more operational parameters that caused the one or more measured statistical parameters from step 904 to be less than the threshold.

At step 914, the operational control flow selects an image calibration signal from the one or more calibration signals. In an exemplary embodiment, the image calibration signal is characterized by a single frequency. The image calibration signal causes an unwanted image, such as the unwanted image 474 to provide an example, to be embedded within the transmitted communications signal when a phase of one or more carrier waves, such the first transmitter carrier wave 356a and/or the phase the second transmitter carrier wave 356b to provide an example, are offset by the undesirable phase offset θ.

At step 916, the operational control flow measures the one or more statistical parameters of the unwanted image embedded within the transmitted communications signal in response to the image calibration signal from step 914 to provide one or more measured statistical parameters, such as the peak envelope value 752, the maximum value 756, and/or the minimum value 758 to provide some examples.

At step 918, the operational control flow compares the one or more measured statistical parameters from step 916 to a threshold, such as the image rejection threshold 754 to provide an example. The threshold may represent a maximum value of the unwanted image so that the communications receiver may adequately recover the one or more recovered information signals from the received communications signal. Alternatively, the threshold may be defined by a communications standard, such as the Bluetooth Specification, of which version 3.0+HS is the latest. The Bluetooth Specification version: 3.0+HS is incorporated by reference herein in its entirety.

At step 920, the operational control flow proceeds to step 922 if the one or more measured statistical parameters from step 916 are less than the threshold. Else, the operation control flow proceeds to step 924.

At step 922, the operational control flow adjusts a second set of one or more operational parameters, such the phase of the in-phase processed sequence of data 252a and/or the phase of the quadrature phase processed sequence of data 252b and/or the phase of the in-phase the first transmitter carrier wave 356a and/or the phase of the second transmitter carrier wave 356b to provide some examples. The operational control flow increases and/or decreases the second set of the one or more operational parameters. As a result, the unwanted image from step 914 either increases, decreases, or remains substantially the same in response to this adjustment. In an exemplary embodiment, an amount of the increase and/or the decrease of the second set of the one or more operational parameters is determined in accordance with a binary search.

At step 924, the unwanted image is sufficiently optimized to allow the communications receiver to adequately recover the one or more recovered information signals from the received communications signal. The operational control flow proceeds to step 804 to enter into the normal mode of operation for transmission of the one or more information signals using the one or more optimized sets of the first set of one or more operational parameters and/or the one or more optimized sets of the second set of one or more operational parameters.

Conclusion

It is to be appreciated that the Detailed Description section, and not the Abstract section, is intended to be used to interpret the claims. The Abstract section may set forth one or more, but not all exemplary embodiments, of the present invention, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method for adjusting an operational parameters of a communications transmitter having one or more imperfection that causing undesirable noise or interference to be embedded within a transmitted communications signal, comprising:
selecting a calibration signal;
processing the calibration signal to provide the transmitted communications signal;
measuring the transmitted communications signal in an analog domain to determine a peak value of the undesirable noise or interference;
comparing the peak value to a threshold to provide a compensation parameter, the compensation parameter being indicative of whether the peak value exceeds the threshold; and
adjusting operational parameter compensation parameters.

2. The method of claim 1, wherein the selecting comprises:
selecting a direct current (DC) offset calibration signal as the calibration signal.

3. The method of claim 2, wherein the selecting further comprises:
selecting a digital logic value of zero as the DC offset calibration signal.

4. The method of claim 1, wherein the processing comprises:
processing the calibration signal using a digital processing function or an analog processing function to provide the transmitted communications signal.

5. The method of claim 1, wherein the undesirable noise or interference comprises an unwanted local oscillator (LO) offset, and wherein the measuring comprises:
measuring a peak value of the unwanted LO offset to provide the compensation parameter.

6. The method of claim 1, wherein the comparing comprises:
providing the compensation parameter at a first voltage level when the peak value of the undesirable noise or interference is greater than the threshold; and
providing the compensation parameter at a second voltage level when the peak value of the undesirable noise or interference is less than the threshold.

7. The method of claim 6, further comprising:
repeating the measuring through the adjusting until the compensation parameter reaches the second voltage level.

8. The method of claim 1, wherein the adjusting comprises:
adjusting a direct current (DC) compensation offset in response to the compensation parameter.

9. The method of claim 1, further comprising:
selecting an image calibration signal as a second calibration signal.

10. The method of claim 1, further comprising:
measuring a peak value of an envelope of the transmitted communications signal; and
comparing the peak value to a second threshold to provide a second compensation parameter.

11. The method of claim 10, wherein the comparing the peak value to the second threshold comprises:
providing the second compensation parameter at a first voltage level when the envelope is greater than the threshold; and
providing the second compensation parameter at a second voltage level when the envelope is less than the threshold.

12. An apparatus for adjusting an operational parameter of a communications transmitter, the communications transmitter having an imperfection that causes undesirable noise or interference to be embedded within a transmitted communications signal, comprising:
a baseband processor configured to select a calibration signal and to process the calibration signal to provide the transmitted communications signal; and
a calibration module configured to measure a statistical parameter of the transmitted communications signal in an analog domain to provide a compensation parameter, wherein the baseband processor is further configured to adjust the operational parameter in response to the compensation parameter.

13. The apparatus of claim 12, wherein the calibration signal comprises:
a direct current (DC) offset calibration signal.

14. The apparatus of claim 13, wherein the DC offset calibration signal comprises:
a digital logic value of zero.

15. The apparatus of claim 12, wherein the baseband processor is further configured to process the calibration signal using a digital processing function to provide a processed sequence of data, and wherein the apparatus further comprises:
  a modulator configured to process the processed sequence of data using a first analog processing function to provide a modulated communications signal; and
  a front end module configured to process the modulated communications signal using a second analog processing function to provide the transmitted communications signal.

16. The apparatus of claim 12, wherein the undesirable noise or interference comprises:
  an unwanted local oscillator (LO) offset, the calibration module being further configured to measure a peak value of the unwanted LO offset.

17. The apparatus of claim 12, wherein the calibration module is further configured to measure a peak value of an envelope of the transmitted communications signal as the statistical parameter, to provide the compensation parameter at a first voltage level when the peak value is greater than a threshold, and to provide the compensation parameter at a second voltage level when the peak value is less than the threshold.

18. The apparatus of claim 12, wherein the operational parameter comprises:
  a direct current (DC) offset, the DC offset being adjusted in response to the compensation parameter.

19. The apparatus of claim 12, wherein the operational parameter comprises:
  a phase of a transmitter carrier wave;
  a direct current (DC) offset associated with the transmitted signal;
  an amplitude response of the communications transmitter; or
  a phase response of the communications transmitter.

20. The apparatus of claim 12, wherein the baseband processor is further configured to process the calibration signal to provide a processed sequence of data, and wherein the operational parameter comprises:
  a phase of the processed sequence of data.

21. An apparatus for adjusting an operational parameter of a communications transmitter, the communications transmitter having an imperfection that causes undesirable noise or interference within a transmitted communications signal, the apparatus comprising:
  a baseband processor configured to select a calibration signal and to process the calibration signal to provide the transmitted communications signal; and
  a calibration module configured to:
    measure a peak value of an envelope of the transmitted communications signal in an analog domain to provide a compensation parameter; and
    compare the peak value to a threshold to provide the compensation parameter, the compensation parameter being indicative of whether the peak value exceeds the threshold,
  wherein the baseband processor is further configured to adjust the operational parameter in response to the compensation parameter.

22. The apparatus of claim 21, wherein the calibration signal comprises:
  an image calibration signal.

23. The apparatus of claim 21, wherein the baseband processor is further configured to process the calibration signal using a digital processing function to provide a processed sequence of data, and wherein the apparatus farther comprises:
  a modulator configured to process the processed sequence of data using a first analog processing function to provide a modulated communications signal; and
  a front end module configured to process the modulated communications signal using a second analog processing function to provide the transmitted communications signal.

24. The apparatus of claim 21, wherein the undesirable noise or interference comprises:
  an unwanted image signal, the compensation module being further configured to measure the peak value of the unwanted image signal.

25. The apparatus of claim 21, wherein the compensation module is further configured to provide the compensation parameter at a first voltage level when the peak value is greater than the threshold and to provide the compensation parameter at a second voltage level when the peak value is less than the threshold.

26. The apparatus of claim 21, wherein the operational parameter comprises:
  a phase of a transmitter carrier wave.

27. The apparatus of claim 21, wherein the baseband processor is further configured to process the calibration signal to provide a processed sequence of data and wherein the operational parameter comprises:
  a phase of the processed sequence of data.

28. The apparatus of claim 21, wherein the threshold is a signal parameter associated with successful recovery of information within the transmitted communications signal by a communications receiver.

* * * * *

UNITED STATES PATENT AND TRADEMARK OFFICE
CERTIFICATE OF CORRECTION

PATENT NO. : 8,565,696 B2
APPLICATION NO. : 12/588616
DATED : October 22, 2013
INVENTOR(S) : Meng-An Pan It is certified that error appears in the above-identified patent and that said Letters Patent is hereby corrected as shown below:

In the Claims

Column 19, line 48 claim 1 replace "operational parameters" with --operational parameter--.

Column 19, line 49 claim 1 replace "communications transmitter having one or more" with --communications transmitter, the communications transmitter having an--.

Column 19, line 50 claim 1 replace "that causing undesirable" with --that causes undesirable--.

Column 19, line 62 claim 1 replace "adjusting operational parameter compensation parameters" with --adjusting the operational parameter in response to the compensation parameter--.

Column 22, line 17 claim 23 replace "the apparatus farther" with --the apparatus further--.

Signed and Sealed this
First Day of July, 2014

Michelle K. Lee
*Deputy Director of the United States Patent and Trademark Office*